United States Patent [19]
Hsieh

[11] Patent Number: 6,061,423
[45] Date of Patent: May 9, 2000

[54] FLUOROSCOPY IMAGE RECONSTRUCTION

[75] Inventor: Jiang Hsieh, Brookfield, Wis.

[73] Assignee: General Electric Company, Milwaukee, Wis.

[21] Appl. No.: 09/140,130

[22] Filed: Aug. 25, 1998

[51] Int. Cl.[7] .................................................. A61B 6/03
[52] U.S. Cl. ............................ 378/15; 378/4; 378/901; 378/62
[58] Field of Search ................................. 378/4, 15, 62, 378/901

[56] References Cited

U.S. PATENT DOCUMENTS 5,907,593   5/1999   Hsieh et al. ................................. 378/4

*Primary Examiner*—David V. Bruce
*Attorney, Agent, or Firm*—Armstrong, Teasdale; Christian G. Cabou; Phyllis Y. Price

[57] ABSTRACT

A fluoroscopy imaging system which, in one embodiment, includes a modified halfscan image reconstruction algorithm which provides acceptable image quality along with the benefits of an enhanced temporal response as compared to the OS algorithm, is described. In an exemplary embodiment, the algorithm includes the steps of dividing the projection data into a preselected number of subsets, and for each subset, two partial images are generated: one with a first set of weights (denoted by $T_i$) and the other with a second, i.e., unity, set of weights (denoted by $U_i$). The final image, $P_i$, is generated from the two partial images.

20 Claims, 2 Drawing Sheets

FLUOROSCOPY IMAGE RECONSTRUCTION

BACKGROUND OF THE INVENTION

This invention relates generally to imaging and more particularly, to a generating fluoroscopic images system.

In at least one known imaging system generally referred to as a computed tomography (CT) system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a one fan beam helical scan. The helix mapped out by the fan beam yields projection data from which images in each prescribed slice may be reconstructed.

In CT fluoroscopic systems ("CT Fluoro"), data collected from a helical or cine scan may be utilized to generate sequential frames of images to help, for example, in guiding a needle to a desired location within a patient. A frame corresponds to a two dimensional slice taken through the imaged object. Particularly, projection data is processed at a frame rate to construct an image frame of the object.

With known CT Fluoro systems, the general objective is to increase the frame rate while minimizing image degradation. Increasing the frame rate provides many advantages including, for example, that an operator physician is provided with increased information regarding the location of a biopsy needle. Typically, however, increasing the frame rate is at odds with minimizing image degradation.

The time delay, or latency, of a CT Fluoro system is highly dependent on the nature of the reconstruction algorithm. For example, the time delay of one known CT Fluoro system is less with a halfscan image reconstruction algorithm (HS) and greater with an overscan image reconstruction algorithm (OS). Even though the time delay is greater with OS algorithm, an OS algorithm may be selected in consideration of computational complexity. Specifically, since the weights utilized in the OS algorithm are channel independent, the order of filtering and weighting can be reversed. As a result, the data set can be divided into multiple subsets and two partial images can be generated with each subset. The final image can them be obtained by proper combination of various partial images.

Such an approach, however, cannot be extended to the HS algorithm. Specifically, the halfscan weights are highly channel dependent. Therefore, the order of filtering and weighting can not be reversed. Also, the HS weighting function is also highly view angle dependent. Therefore, no advantage can be taken to make use of the previously filtered and backprojected data for generating a next image. If the halfscan algorithm can be implemented in similar efficiency to the above described OS algorithm, the temporal response of the CT Fluoro system can be significantly improved.

BRIEF SUMMARY OF THE INVENTION

These and other objects may be attained by a CT Fluoro system which, in one embodiment, includes a modified halfscan image reconstruction algorithm which provides acceptable image quality along with the benefits of an enhanced temporal response as compared to the OS algorithm. In an exemplary embodiment, the algorithm includes the steps of dividing the projection data per gantry rotation into a preselected number of subsets, e.g., 8 subsets with each subset containing projection data which expands an angular range of 45 degree. Dividing the projection data into 8 subsets enables, for example, achieving an 8 frames/s image update rate. For each subset, two partial images are generated: one with a first set of weights (denoted by $T_i$) and the other with a second, i.e., unity, set of weights (denoted by $U_i$). The final image, $P_i$, is generated in accordance with the following:

$$P_i = T_i - T_{i+N-1} + \sum_{i+1}^{i+N-1} U_k \qquad (1)$$

where N is the number of set-sets divided per gantry rotation from each data set.

DETAILED DESCRIPTION OF THE INVENTION

Figure 1:
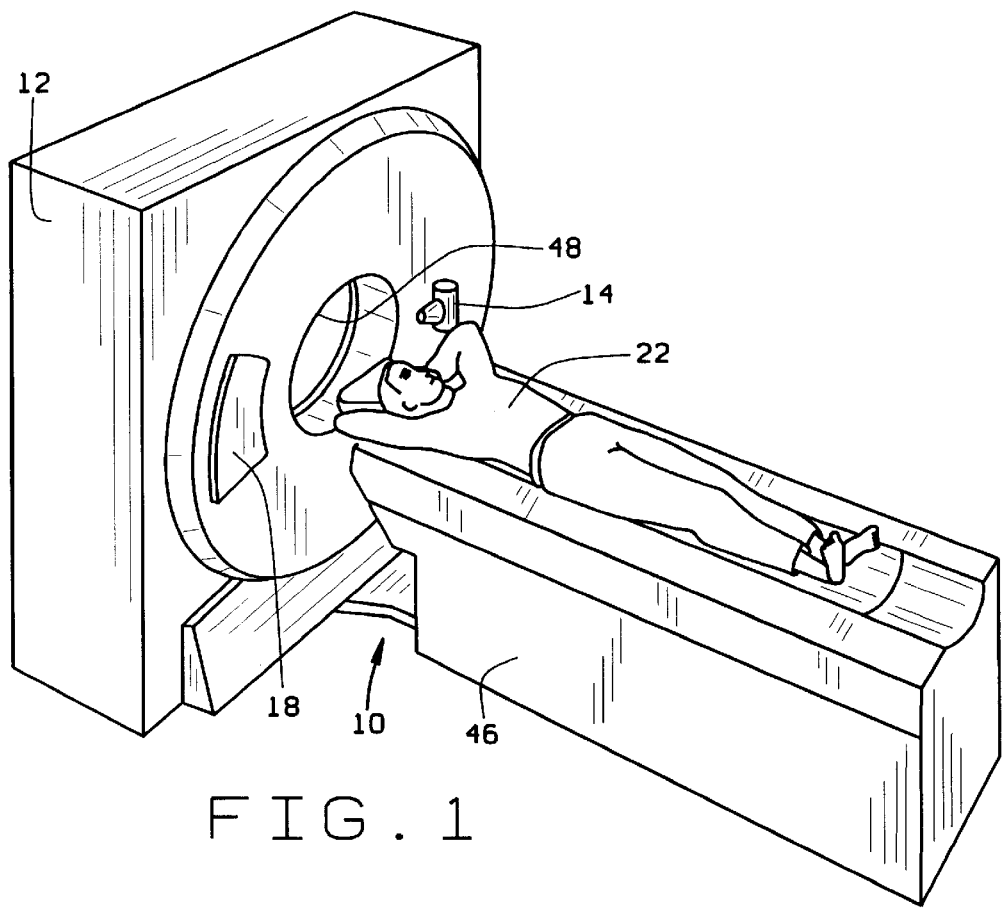
FIG. 1 is a pictorial view of a CT imaging system.
Figure 2:
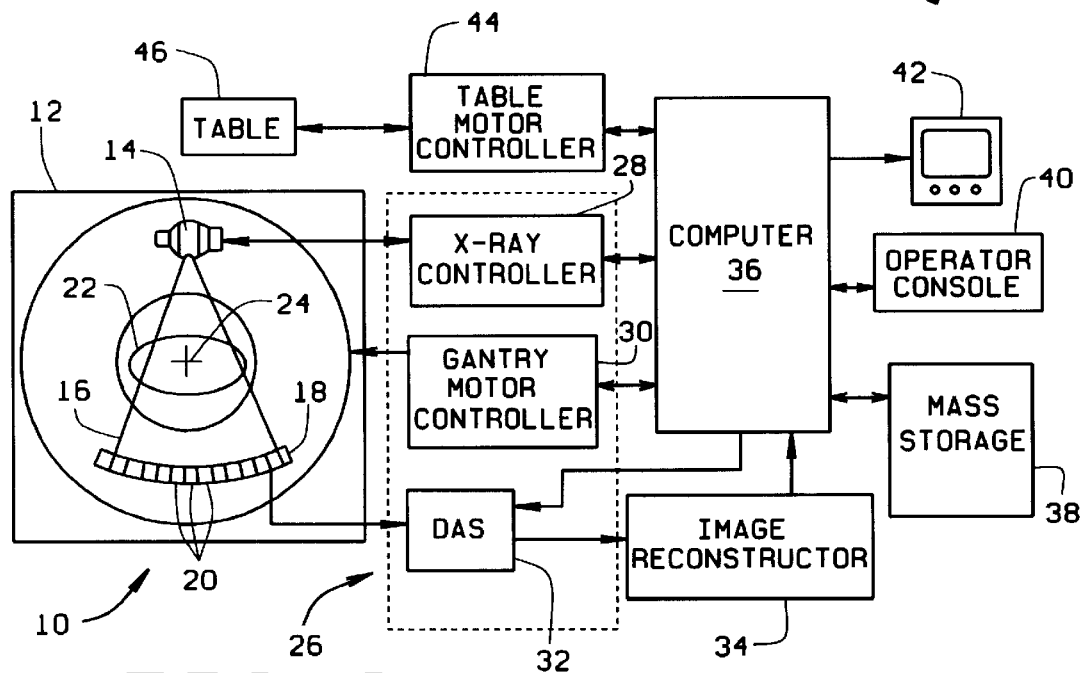
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The image reconstruction algorithms described herein typically are implemented by image reconstructor 34. Such algorithms, however, could be implemented in other components of the imaging system such as in computer 36. Also, it should be understood that system 10 is described herein by way of example only, and the following described image reconstruction algorithms can be practiced in connection with many other types of imaging systems.

Figure 3:
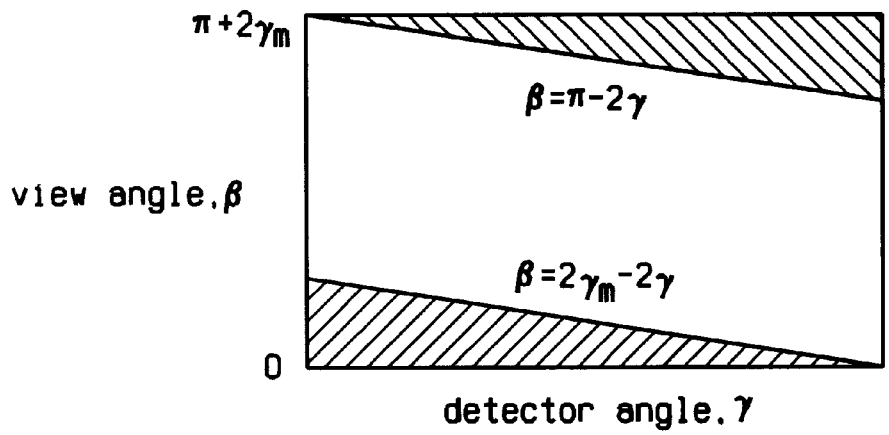
FIG. 3 is a radon space diagram for original halfscan.

FIG. 3 depicts a Radon space representation of the HS sampling pattern. The lower and upper shaded triangles represent redundant sampling pairs. To ensure artifact free reconstruction, the redundant samples must be properly weighted. An example of such a function is described below:

$$\omega(\gamma,\beta)=3\theta^2(\gamma,\beta)-2\theta^3(\gamma,\beta) \quad (2)$$

where, $$\theta(\gamma, \beta) = \begin{cases} \dfrac{\beta}{2\gamma_m - 2\gamma} & 0 \le \beta < 2\gamma_m - 2\gamma \\ 1 & 2\gamma_m - 2\gamma \le \beta < \pi - 2\gamma \\ \dfrac{\pi + 2\gamma_m - \beta}{2\gamma_m - 2\gamma} & \pi - 2\gamma \le \beta \le \pi + 2\gamma_m \end{cases} \quad (3)$$

where $\gamma$ is the angle of a particular ray within the fan beam with respect to the central ray which intersects the iso-center of the CT system, and $\beta$ is the gantry angle.

Since the weights are highly channel dependent, the projection data has to be weighted by the weighting function before filtering. Also, the two shaded triangular regions occupy 180 degrees of projection view angular span. That is, only about 20% of the entire projection data set can be switched for the order of operation for filtering and weighting.

Figure 4:
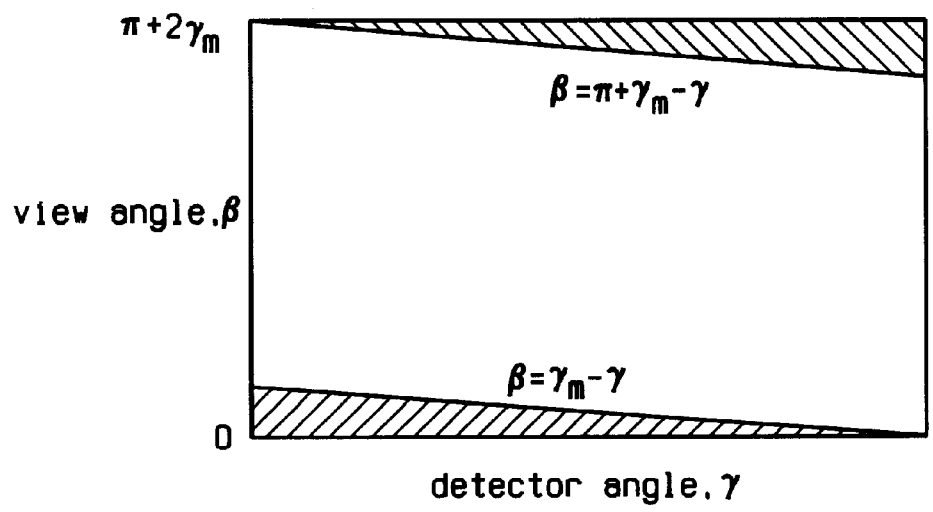
FIG. 4 is a radon space diagram for a modified halfscan.

To overcome this difficulty, a modified halfscan algorithm (MHS) for the fast CT Fluoro reconstruction can be utilized. The Radon space for the MHS is segmented as shown in FIG. 4. The two shaded triangular regions occupy only half of the original angular span of non-uniform weights.

The weights are:

$$w(\gamma, \beta) = \begin{cases} 1 & \gamma_m - \gamma \le \beta < \pi + \gamma_m - \gamma \\ 0 & \text{otherwise} \end{cases} \quad (4)$$

At the lines $\beta=\gamma_m-\gamma$, and $\beta=\pi+\gamma_m-\gamma$, the weighting function is not differentiable with respect to $\gamma$. To suppress image artifacts caused by such discontinuity, feathering may be employed across the boundaries. A feathering distance of 20 channels is believed to be sufficient to suppress imaging artifact related to the discontinuity.

The weighting function of the MHS has the following property:

$$w(\gamma,\beta)=1-w(\gamma,\pi+\beta) \quad (5)$$

Therefore, the weights for the upper triangle can be produced by subtracting the weights of the lower triangle from unity. That is, to produce a partial image with the weights of the upper triangle, two partial images can be produced: one weighted by the weights of the lower triangle and the other with unity weight. A difference image produced by these two partial images will be identical to the one produced directly from the upper triangle.

In view of the above described weighting, the following image reconstruction algorithm can be utilized. Specifically, the projection data set per gantry rotation is first divided into 8 subsets with each sub-set containing projection data which expands an angular range of 45 degree. Dividing the projection data into 8 subsets enables achieving an 8 frames/s image update rate. Alternatively, the data set could be divided into 60 degree subset to achieve 6 frames/s image reconstruction rate, or other size subsets corresponding to a desired frame rate.

For each subset, two partial images are generated: one with the lower (or upper) triangular weights (denoted by $T_i$) and the other with unity weights (denoted by $U_i$). The final image, $P_i$ can be generated in accordance with:

$$P_i = T_i - T_{i+N-1} + \sum_{i+1}^{i+N-1} U_k \quad (6)$$

where N is the number of sebsets divided from each data set.

The above described modified halfscan algorithm takes advantage of the symmetry in the weighting function and enables the reconstruction of images at 8 frames/s with acceptable image quality. As a result, the modified halfscan algorithm enables the use of halfscan weighting in CT Fluoro applications to provide an image with acceptable image quality with the benefits of an enhanced temporal response as compared to the OS algorithm.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A fluoroscopy imaging system comprising a processor programmed to:

weight projection data in accordance with a halfscan weighting function; and generate image data for partial images from the weighted data.

2. A system in accordance with claim 1 wherein to weight the projection data, said processor is programmed to divide the projection data set per gantry rotation into a predetermined number of subsets.

3. A system in accordance with claim 2 wherein the predetermined number of subsets corresponds to a desired frame rate.

4. A system in accordance with claim 2 wherein said predetermined number of subsets is equal to eight and each subset contains projection data which expands an angular range of 45 degrees.

5. A system in accordance with claim 2 wherein said predetermined number of subsets is equal to six and each subset contains projection data which expands an angular range of 60 degrees.

6. A system in accordance with claim 1 wherein at least two partial images are generated, data for one partial image ($T_i$) being weighted with a first weight and data for another partial image (denoted by $U_i$) being weighted with a second weight.

7. A system in accordance with claim 6 wherein said second weight is unity.

8. A system in accordance with claim 6 wherein a final image, $P_i$ is generated in accordance with:

$$P_i = T_i - T_{i+N-1} + \sum_{i+1}^{i+N-1} U_k$$

where N is the number of setsets divided from each data set per gantry rotation.

9. A fluoroscopy imaging system in accordance with claim 1 wherein said system is a computed tomography type imaging system.

10. A computed tomography system for performing fluoroscopy scan, said system comprising an x-ray source, an x-ray detector aligned with said x-ray source, a patient table for being positioned between said x-ray source and said x-ray detector, and a display for displaying image reconstructed from data collected by said detector, said system configured to:

weight projection data in accordance with a halfscan weighting function; and generate image data for partial images from the weighted data.

11. A system in accordance with claim 10 wherein to weight the projection data, said processor is programmed to divide the projection data set per gantry rotation into a predetermined number of subsets.

12. A system in accordance with claim 11 wherein the predetermined number of subsets corresponds to a desired frame rate.

13. A system in accordance with claim 10 wherein at least two partial images are generated, data for one partial image ($T_i$) being weighted with a first weight and data for another partial image (denoted by $U_i$) being weighted with a second weight.

14. A system in accordance with claim 13 wherein a final image, $P_i$ is generated in accordance with:

$$P_i = T_i - T_{i+N-1} + \sum_{i+1}^{i+N-1} U_k$$

where N is the number of setsets divided from each data set.

15. A method for generating an image using data collected in a fluoroscopy scan, said method comprising the steps of:

weighting projection data in accordance with a halfscan weighting function; and generating image data for partial images from the weighted data.

16. A method in accordance with claim 15 wherein weighting the projection data comprises the step of dividing the projection data set per gantry rotation into a predetermined number of subsets.

17. A method in accordance with claim 16 wherein the predetermined number of subsets corresponds to a desired frame rate.

18. A method in accordance with claim 15 wherein at least two partial images are generated, data for one partial image ($T_i$) being weighted with a first weight and data for another partial image (denoted by $U_i$) being weighted with a second weight.

19. A method in accordance with claim 18 wherein a final image, $P_i$ is generated in accordance with:

$$P_i = T_i - T_{i+N-1} + \sum_{i+1}^{i+N-1} U_k$$

where N is the number of setsets divided from each data set.

20. A method in accordance with claim 15 wherein the weighting function for weighting the projection satisfies the condition:

$$w(\gamma,\beta)=1-w(\gamma,\pi+\beta).$$

* * * * *